United States Patent
Schmidt et al.

(10) Patent No.: US 7,950,024 B2
(45) Date of Patent: May 24, 2011

(54) MECHANISM FOR TRANSPARENTLY INTERFACING WITH A THIRD PARTY VERSION CONTROL SYSTEM

(75) Inventors: Kevin T. Schmidt, Pasadena, CA (US); Venugopalan Venkataraman, Diamond Bar, CA (US)

(73) Assignee: Oracle America, Inc., Redwood City, CA (US)

( * ) Notice: Subject to any disclaimer, the term of this patent is extended or adjusted under 35 U.S.C. 154(b) by 925 days.

(21) Appl. No.: 11/645,997

(22) Filed: Dec. 27, 2006

(65) Prior Publication Data

US 2008/0163266 A1 Jul. 3, 2008

(51) Int. Cl.
*G06F 3/00* (2006.01)
*G06F 15/16* (2006.01)
*G06F 15/167* (2006.01)
*G06F 9/45* (2006.01)
*G06F 9/44* (2006.01)

(52) U.S. Cl. ........ 719/328; 709/201; 709/213; 717/122; 717/170

(58) Field of Classification Search ........................ None
See application file for complete search history.

(56) References Cited

U.S. PATENT DOCUMENTS

2003/0237073 A1* 12/2003 Gardas et al. ................. 717/116

OTHER PUBLICATIONS

Sun Microsystems, Inc. The NetBeans Tools Platform, 2001, Sun Microsystems, pp. 1-8.*
Developer.com, The NetBeans Open Source Story, Jan. 18, 2001, pp. 1-10.*

* cited by examiner

*Primary Examiner* — Hyung S Sough
*Assistant Examiner* — Tuan Dao
(74) *Attorney, Agent, or Firm* — Osha • Liang LLP

(57) ABSTRACT

Approaches for transparently interfacing with a third party version control system (VCS) are provided. In one approach, an enterprise application integration (EAI) system comprises an integrated development environment (IDE) client, a repository, an API, and an API implementation. The IDE client enables a user to develop one or more functional components that can be used or executed to derive one or more enterprise application functionalities. The repository interacts with the IDE client to save and access the one or more functional components. The API is invoked by the repository to interact with any VCS. The API implementation enables the repository, by way of invoking the API, to interact with a VCS, which is an external VCS that is not provided as part of the EAI system.

17 Claims, 4 Drawing Sheets

MECHANISM FOR TRANSPARENTLY INTERFACING WITH A THIRD PARTY VERSION CONTROL SYSTEM

BACKGROUND

Early software programs in areas such as inventory control, human resources, sales automation, and database management were designed to run independently, with no interaction between the programs. The programs were custom built in the technology of the day for a specific need being addressed and were often proprietary systems. As enterprises grew and recognized the need for their information and applications to have the ability to be transferred across and shared between systems, companies began investing in enterprise application integration (EAI) systems in order to streamline processes and keep all the elements of the enterprise interconnected.

Some EAI systems include an integrated development environment (IDE; also known as "integrated design environment" and "integrated debugging environment"). An IDE is a type of computer software that assists computer programmers in developing integrated software applications. IDEs typically consist of a source code editor, a compiler and/or interpreter, build-automation tools, and (usually) a debugger. Sometimes a version control system (VCS) and various tools to simplify the construction of a GUI are integrated as well. Although some multiple-language IDEs are in use, such as the Eclipse IDE, NetBeans, and Microsoft Visual Studio, an IDE is typically devoted to a specific programming language, as in the Visual Basic IDE.

Today, many EAI systems contain their own VCS. However, many enterprises that purchase EAI systems prefer to continue to use their existing third party VCS rather than the embedded VCS of their respective EAI system. Common third party VCSs include Concurrent Versions System (CVS), Source Code Control System (SCCS), and Clear Case. Such enterprises typically configure an IDE client to interact directly with the third party VCS. In order to use a third party VCS, an integration project is saved locally as components (e.g., files) and the components are then checked into the third party VCS. A plug-in (i.e., an API) is used to allow the IDE client to interact with the third party VCS.

FIG. 1 is a block diagram illustrating this approach for enabling an IDE client 102 to interact with a third party VCS. IDE client 102 interacts with a VCS through a version control API 104. The API 104 is implemented by an API implementation 106.

The system of FIG. 1 may operate as follows. A source file for a coding project is created and stored locally on IDE client 102. A user (e.g., through a GUI of IDE 102) initiates a check-in operation, whereby IDE 102 invokes the VCS API 104, which causes the API implementation 106 to be executed. In turn, the API implementation 106 invokes the check-in function of the VCS 110, which causes the source file to be stored in data storage 112.

A disadvantage of the above approach is the significant risk of losing work if a user does not take the steps necessary to check in modified files to a VCS. For example, if a user forgets to check in modified files, then all the changes may be lost when the user logs out of the system. Therefore, there is a need to provide a better mechanism for enabling a third party VCS to be used in an EAI system.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

An approach for transparently interfacing with a third party version control system (VCS) is provided herein. According to an embodiment, an enterprise application integration (EAI) system comprises an integrated development environment (IDE) client, a repository, an API, and an API implementation. The IDE client enables a user to develop functional components that can be used or executed to derive one or more enterprise application functionalities. The repository interacts with the IDE client to save and access the functional components. The API is invoked by the repository to interact with any VCS. The API implementation enables the repository, by way of invoking the API, to interact with a VCS, which is an external VCS that is not provided as part of the EAI system. Thus, the IDE client need not be concerned with aspects of the VCS because the repository takes care of them.

In one embodiment, multiple API implementations may be provided. These API implementations enable the same API to be used to interact with different VCSs.

BRIEF DESCRIPTION OF THE DRAWINGS

The systems and methods described herein are illustrated by way of example, and not by way of limitation, in the figures of the accompanying drawings. Similar reference numbers are used throughout the drawings to reference similar elements and features.

DETAILED DESCRIPTION OF THE EMBODIMENT(S)

The systems and methods described herein relate to transparently interfacing with a third party version control system. For purposes of explanation, numerous specific details are set forth in order to provide a thorough understanding of the various systems and methods. It will be apparent, however, that the systems and methods described herein may be implemented without these specific details. The specification and drawings are, accordingly, to be regarded in an illustrative rather than a restrictive sense.

System Overview

Figure 1:
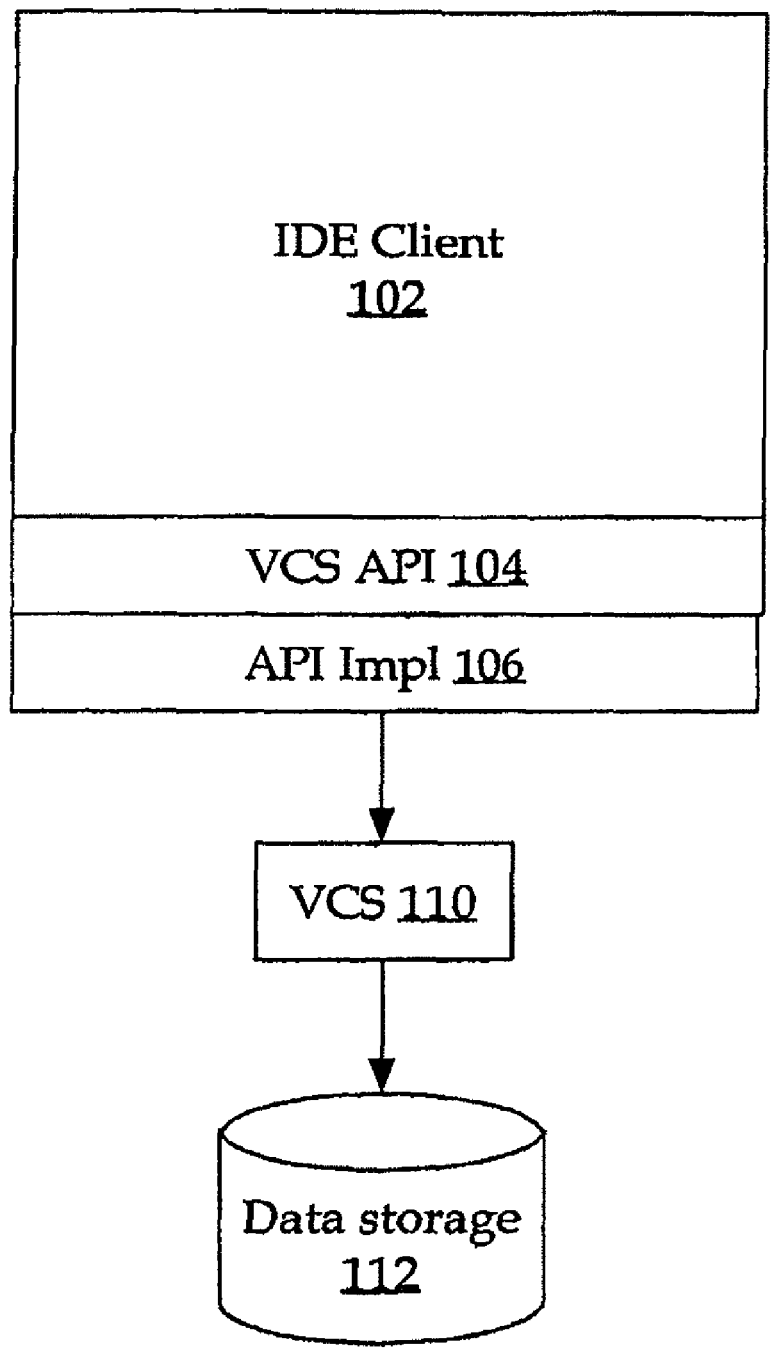
FIG. 1 is a block diagram illustrating a prior art approach for providing a third party VCS to an IDE client.
Figure 2:
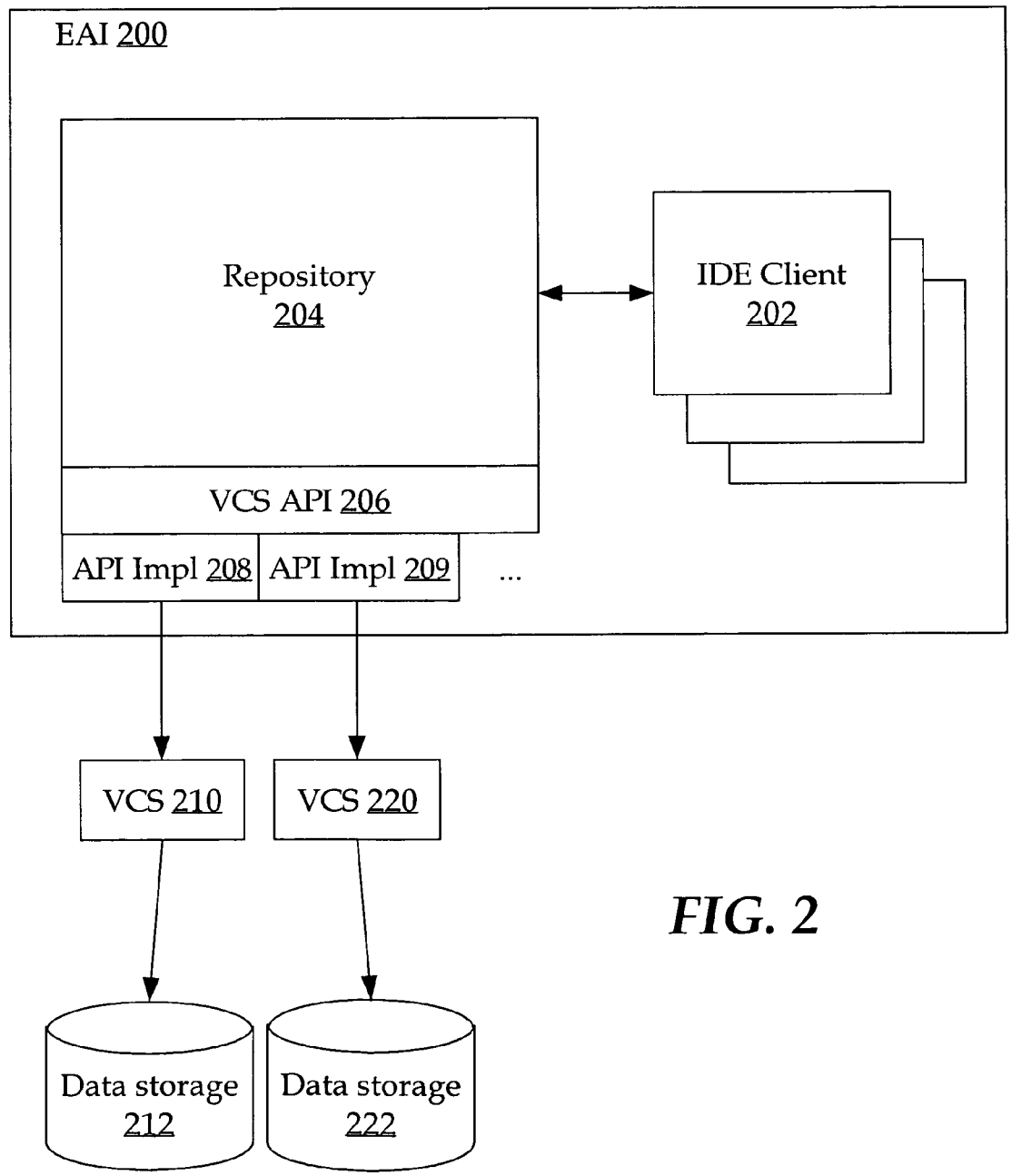
FIG. 2 is a block diagram illustrating a repository that interacts with a third party VCS, in accordance with an embodiment of the present invention.

FIG. 2 is a block diagram illustrating an EAI system 200, in accordance with an embodiment of the present invention. EAI system 200 comprises one or more IDE clients 202 and a repository 204. EAI system 200 may also comprise an integrated VCS (not shown) that is provided with EAI system 200. However, it is presumed that a third party VCS is used rather than the native VCS; hence, there is a need for a VCS API.

IDE Client and Repository

With an IDE client, such as IDE client 202, a user defines all or portions of an enterprise application. For example, a user may develop enterprise applications through all phases of development—generating source code, compiling the source code, and debugging the source code—all with an IDE client. Overall, a user may use IDE client 202 to define functional software components that can be executed to give rise to an enterprise application. When the user is ready to save components, the user causes IDE client 202 to invoke repository 204. Repository 204 responds by causing components (which may take the form of definition, configuration, and/or executable files) to be stored in a VCS. Similarly, repository 204 accesses components requested by IDE client 202.

Although IDE client 202 "knows" that it is saving and accessing components, IDE client 202 may be unaware that any VCS is involved. As far as IDE client 202 knows, IDE client 202 is simply saving and accessing components. On the other hand, repository 204 knows that it is interacting with a VCS; however, repository 204 is not required to know which particular VCS it is interacting with. The API implementation takes care of the specifics of the VCS. In software terms, the third party VCS is "transparent" to IDE client 202 and repository 204. In other words, in the views of IDE client 202 and repository 204, it is as if the native VCS provided with EAI system 200 were used instead of a third party VCS.

With the information from IDE client 202, repository 204 invokes a VCS API 206. By doing so, repository 204 causes components to be stored in, or accessed from, a VCS, such as VCS 210. In one embodiment, the VCS is not native to EAI system 200 but is provided by a third party. VCS API 206 provides repository 204 with a standard interface that it can use to interact with any third party VCS. The API implementation will translate the API calls into proper calls for invoking the functionalities of the specific third party VCS.

Components

Components are analogous to source files with a traditional IDE. Components are not required to be stored locally on a user's system (like files) but rather may be stored through the repository.

Components may be any of various types of files, such as files from a Java collaboration and object type definitions or OTDs (which represent different kinds of messages that are used in executing EAI applications). Components may include definition files, configuration files, executable files, and all metadata about a particular project that is built. Ultimately, components may be stored in a VCS as a file. In one embodiment, a component is an XML file that describes an object, which indicates that the repository may model an object database.

VCS API

VCS API 206 provides methods that can be called by repository 204 to access and store components. Some methods may include:

checkIn: Allows the user to check in objects to VC
checkOutForRead: Allows the user to check out objects for read only
checkOutForWrite: Allows the user to check out objects for write with lock
getHistory: Allows the user to get history of an object
label: Allows the user to label objects
unlock: Allows the user to unlock the objects locked by checkOutForWrite operation
createBranch: Allows the user to create a new branch
getAllBranchNames: Gets all the branches in the VC repository
tag: Allows the user to create a new tag

API Implementations

API implementations, such as API implementation 208, implement VCS API 206. There is one API implementation for each VCS. The API implementation translates calls to the methods of the API into proper calls for invoking the functionalities of the specific VCS. In normal operation, because only one VCS is used at a time, only one API implementation is required. In order to use another VCS, another API implementation is implemented. Multiple API implementations (i.e., 208 and 209) are shown to illustrate that any VCS may be used, so long as a proper API implementation is provided. Each VCS may provide a different interface for interacting with other components. Thus, an API implementation includes logic to properly interact with a VCS (e.g., call the right methods of the VCS).

For example, suppose a VCS provides several methods that can be invoked, such as "check-in" and "check-out". Suppose further that these methods need to be invoked in a certain way using a certain call or message format; suppose further that the API has the methods "save" and "retrieve". When the repository invokes the "save" method, the API implementation translates that into a "check-in" request with the proper format. Similarly, when the repository invokes the "retrieve" method, the API implementation translates that into a "check-out" request with the proper format.

Data Storage

FIG. 2 illustrates that a single data storage container is used for each VCS (i.e., data storage 212 for VCS 210 and data storage 222 for VCS 220). However, a single VCS may use multiple data storage containers for storing components. Alternatively, multiple VCS may share a single data storage container.

Sample Operation

The following is an example of how components may be stored and accessed in an EAI system, such as EAI system 200. Using IDE client 202, a user logs into EAI system 200 and develops a new component for an enterprise application. Using IDE client 202, the user saves the new component. Repository 204 receives the save request and invokes VCS API 206 (e.g., invokes the "save" method of API 206). In response to the invocation of the API 206, the API implementation 208 translates the invocation into a proper call to VCS 210 having the format expected by VCS 210. The proper call may be, for example, "check-in". The API implementation 208 then sends the call to VCS 210. VCS 210 subsequently checks the component in to data storage 212.

Thus, by saving the component, the IDE client is causing the component to be checked in to a VCS. The IDE client does not even have to be aware that the component is being checked in to the VCS. With this setup, a user does not have to save a file locally and then affirmatively check the component in. The check in process is performed automatically and transparently to the user, which is a significant improvement over the current methodology.

In one embodiment, repository 204 implements a "workspace" for each user. A user may save work (e.g., modified components) to his/her respective workspace without performing a check-in. Thus, the user may later choose to check-in a modified component, which then causes VCS API 206 to be used and the modified component to be checked into VCS 210. Therefore, in this embodiment, a save operation by a user does not automatically check-in the component to the appropriate VCS. However, because a user's workspace is still within the repository, different client machines may access saved work. Also, saved work is not lost if the user fails to check in a modified component as is the case with traditional IDEs.

In a subsequent session, the user logs into EAI system 200 and desires to modify the newly created component. Using IDE client 202, the user requests the component from repository 204. In response to the request from IDE client 202, repository 204 invokes VCS API 206, for example, by calling the "retrieve" method. API implementation 208 translates the "retrieve" method into a proper call and format, such as a "check-out" call. VCS 210 then checks out the component from data storage 212 and provides the component to repository 204, which provides the component to IDE client 202.

EAI system 200 may comprise multiple version control systems (as illustrated), such as VCS 210 and VCS 220. Accordingly, the EAI system may comprise multiple API implementations 208 and 209, one for each VCS. In such a system, the user (or another user) may use IDE client 202 to save components to, and retrieve components from, repository 204. In response to requests to save components, repository 204 invokes methods of VCS API 206. In response to the invocations of the API 206, one of the API implementations (e.g., the API implementation 209) translates the invocations into proper calls to VCS 220 having the format expected by VCS 220. The API implementation 209 then sends the calls to VCS 220 to, for example, check components in and out of data storage 222.

In one embodiment, VCS 220, like VCS 210, is not an integrated VCS provided with repository 204 and/or IDE client 202 but rather is a VCS provided by a third party.

One benefit of the above approach is that, rather than storing files locally, files are stored through a repository, which is a common place that multiple IDE clients may connect to in order to ensure that all modified files are checked into a VCS. Otherwise, when working with local files, there is a significant risk that one or more users will forget to perform a check-in of modified components, thus losing important changes and wasting valuable time.

Figure 4:
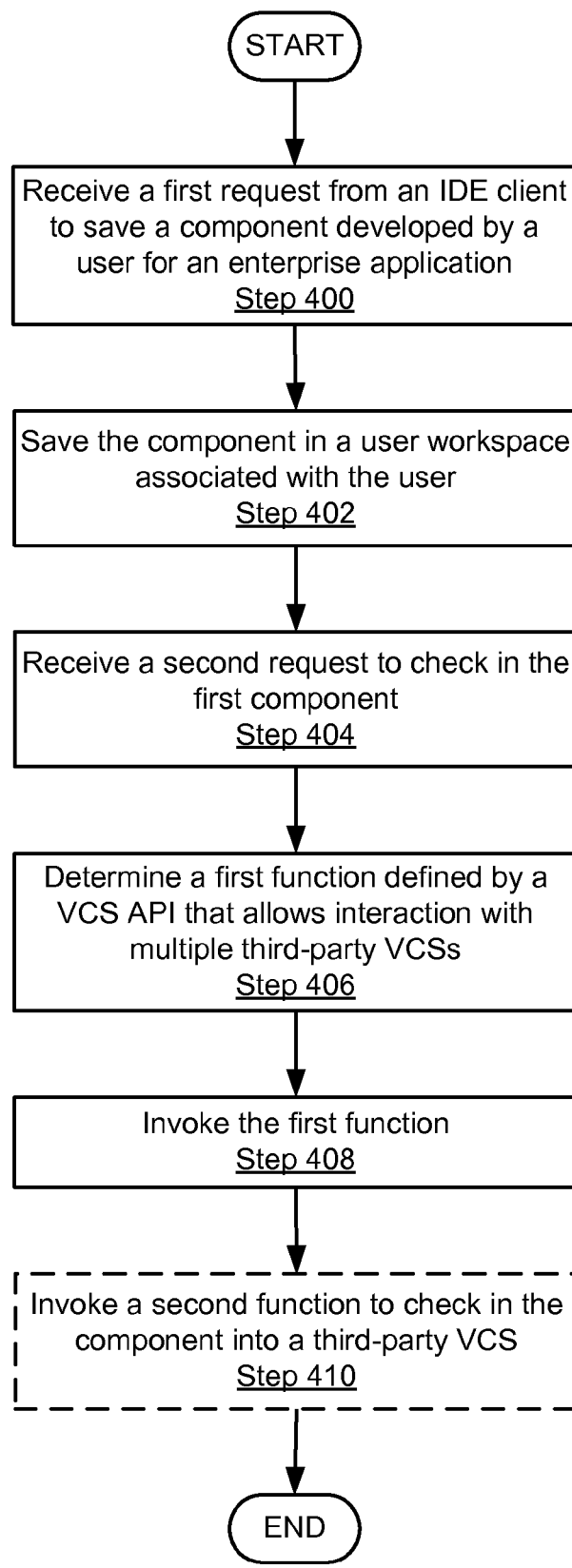
FIG. 4 is a flow chart illustrating the steps for managing a component in accordance with an embodiment of the present invention.

FIG. 4 shows a flow chart illustrating the steps for managing a component in accordance with an embodiment of the present invention. In Step 400, a first request is received from an IDE client to save a component developed by a user for an enterprise application. In Step 402, the component is saved in a user workspace associated with the user. In Step 404, a second request is received to check in the first component. In one or more embodiments of the invention, the second request is received from the IDE client. In Step 406, a determination is made of a first function defined by a VCS API that allows interaction with multiple third-party VCSs. In Step 408, the first function is invoked. In Step 410, a second function is invoked to check in the component into a third-party VCS. In one or more embodiments of the invention, Steps 400-408 may be performed by a repository as discussed in relation to FIG. 2. In one or more embodiments of the invention, Step 410 may be performed by an API implementation as discussed in relation to FIG. 2.

Hardware Overview

Figure 3:
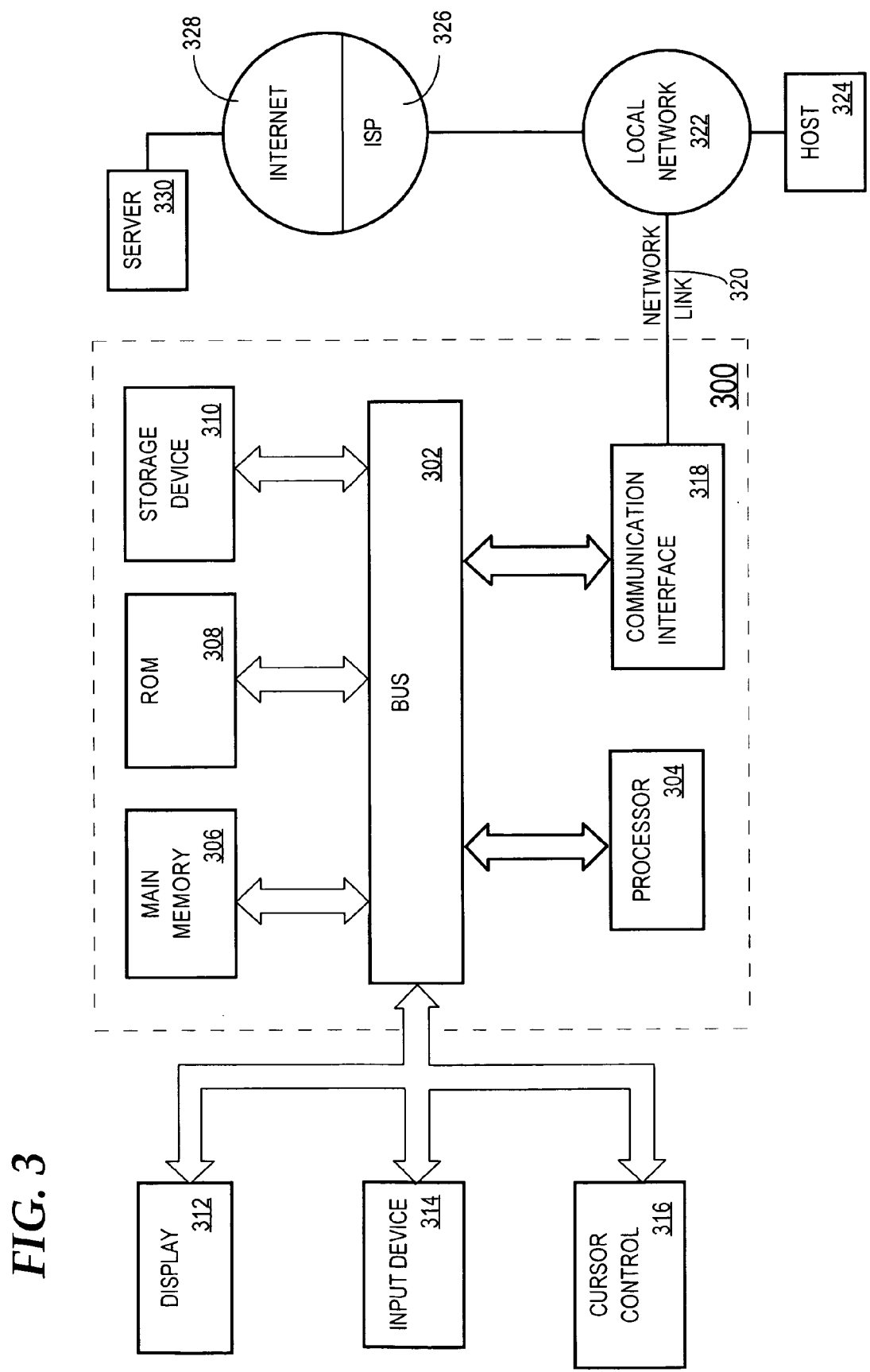
FIG. 3 is a block diagram that illustrates a computer system upon which an embodiment in accordance with the present invention may be implemented.

FIG. 3 shows one possible embodiment of a platform for executing the instructions. Computer system 300 includes a bus 302 for facilitating information exchange, and one or more processors 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions by processor 304. Computer system 300 may further include a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312 for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

In computer system 300, bus 302 may be any mechanism and/or medium that enables information, data, etc., to be exchanged between the various components. Bus 302 may further be a network connection that connects one or more of the components. Any mechanism and/or medium that enables information, data, etc., to be exchanged between the various components may be used as bus 302.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any storage medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and tangible media. Non-volatile media includes, for example, optical or magnetic disks, such as storage device 310. Volatile media includes dynamic memory, such as main memory 306.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, or any other tangible, non-transitory medium from which a computer can read.

Various forms of machine-readable media may be involved in carrying one or more sequences of one or more instructions to processor 304 for execution. For example, the instructions may be carried on a magnetic disk of a remote computer. Bus 302 may carry the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented.

Network link 320 typically provides data communication through one or more networks to other devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A method for managing components, comprising:
receiving, using a processor interacting with a first integrated development environment (IDE) client, a first request from the first IDE client to save a first component developed by a first user for an enterprise application;
saving, using the processor interacting with a repository, the first component in a first user workspace in the repository, wherein the first user workspace is associated with the first user;
receiving, using the processor interacting with the first IDE client, a second request from the first IDE client to check in the first component;
determining, using the processor interacting with the repository, a first function based on the second request, wherein the first function is defined by a version control system (VCS) application programming interface (API) that allows interaction with multiple third-party VCSs; and
invoking, using the processor interacting with the repository, the first function,
wherein, in response to invoking the first function, a first implementation of the VCS API for a first third-party VCS invokes a second function defined by the first third-party VCS for checking the first component into the first third-party VCS,
wherein checking the first component into the first third-party VCS comprises saving the first component into the first third-party VCS, and
wherein the repository and the first third-party VCS are distinct.

2. The method of claim 1, further comprising:
receiving, using the processor interacting with the first IDE client, a third request from the first IDE client to access the first component;
determining, using the processor interacting with the repository, a third function based on the third request to access the first component, wherein the third function is defined by the VCS API; and
invoking, using the processor interacting with the repository, the third function,
wherein, in response to invoking the third function, the first implementation of the VCS API for the first third-party VCS invokes a fourth function defined by the first third-party VCS for checking the first component out of the first third-party VCS.

3. The method of claim 2, wherein the first component is a definition file.

4. The method of claim 2, wherein the first component is an executable file.

5. The method of claim 2, further comprising:
receiving, using the processor interacting with the first IDE client, a fourth request from the first IDE client to save a second component developed for the enterprise application;
determining, using the processor interacting with the repository, the first function based on the fourth request to save the second component;
invoking, using the processor interacting with the repository, the first function, wherein, in response to invoking the first function, a second implementation of the VCS API for a second third-party VCS invokes a fifth function defined by the second third-party VCS for checking the second component into the second third-party VCS, wherein checking the second component into the second third-party VCS comprises saving the second component into the second third-party VCS, and wherein the repository and the second third-party VCS are distinct;
receiving, using the processor interacting with the first IDE client, a fifth request from the first IDE client to access the second component;
determining, using the processor interacting with the repository, the third function based on the fifth request to access the second component; and
invoking, using the processor interacting with the repository, the third function, wherein, in response to invoking the third function, the second implementation of the VCS API for the second third-party VCS invokes a sixth function defined by the second third-party VCS for checking the second component out of the second third-party VCS.

6. The method of claim 1, further comprising:
receiving, using the processor interacting with the first IDE client, a third request from the first IDE client to retrieve the first component for the first user;
retrieving, using the processor interacting with the repository, the first component from the first user workspace, wherein the first user, using the processor interacting with the first IDE client, modifies the first component; and receiving, using the processor interacting with the first IDE client, a fourth request from the first IDE client to resave the first component in the first user workspace.

7. The method of claim 1, further comprising:
receiving, using the processor interacting with a second IDE client, a third request from the second IDE client to retrieve the first component for a second user;

retrieving, using the processor interacting with the repository, the first component from the first user workspace, wherein the second user, using the processor interacting with the second IDE client, modifies the first component; and receiving, using the processor interacting with the second IDE client, a fourth request from the second IDE client to resave the first component in the first user workspace.

8. A machine-readable medium, comprising one or more sets of instructions which, when executed by one or more processors, cause the one or more processors to perform the operations of:
receiving, using a processor interacting with an integrated development environment (IDE) client, a first request from the IDE client to save a first component developed by a user for an enterprise application;

saving, using the processor interacting with a repository, the first component in a user workspace in the repository, wherein the user workspace is associated with the user;

receiving, using the processor interacting with the IDE client, a second request from the IDE client to check in the first component;

determining, using the processor interacting with the repository, a first function based on the second request, wherein the first function is defined by a version control system (VCS) application programming interface (API) that allows interaction with multiple third-party VCSs; and invoking, using the processor interacting with the repository, the first function, wherein, in response to invoking the first function, a first implementation of the VCS API for a first third-party VCS invokes a second function defined by the first third-party VCS for checking the first component into the first third-party VCS, wherein checking the first component into the first third-party VCS comprises saving the first component into the first third-party VCS, and wherein the repository and the first third-party VCS are distinct.

9. The machine-readable medium of claim 8, further comprising:
receiving, using the processor interacting with the IDE client, a third request from the IDE client to access the first component;

determining, using the processor interacting with the repository, a third function based on the third request to access the first component, wherein the third function is defined by the VCS API; and invoking, using the processor interacting with the repository, the third function, wherein, in response to invoking the third function, the first implementation of the VCS API for the first third-party VCS invokes a fourth function defined by the first third-party VCS for checking the first component out of the first third-party VCS.

10. The machine-readable medium of claim 9, wherein the first component is a definition file.

11. The machine-readable medium of claim 9, wherein the first component is an executable file.

12. The machine-readable medium of claim 9, further comprising:
receiving, using the processor interacting with the IDE client, a fourth request from the IDE client to save a second component developed for the enterprise application;

determining, using the processor interacting with the repository, the first function based on the fourth request to save the second component;

invoking, using the processor interacting with the repository, the first function, wherein, in response to invoking the first function, a second implementation of the VCS API for a second third-party VCS invokes a fifth function defined by the second third-party VCS for checking the second component into the second third-party VCS, wherein checking the second component into the second third-party VCS comprises saving the second component into the second third-party VCS, and wherein the repository and the second third-party VCS are distinct;

receiving, using the processor interacting with the IDE client, a fifth request from the IDE client to access the second component;

determining, using the processor interacting with the repository, the third function based on the fifth request to access the second component; and invoking, using the processor interacting with the repository, the third function, wherein, in response to invoking the third function, the second implementation of the VCS API for the second third-party VCS invokes a sixth function defined by the second third-party VCS for checking the second component out of the second third-party VCS.

13. A system for managing components, comprising:
a processor;
a storage device configured to store a component; and
a memory coupled to the processor, wherein the memory comprises executable instructions to:
receive, from an integrated development environment (IDE) client interacting with the processor, a first request to save a first component developed by a user for an enterprise application;

save the first component in a first user workspace associated with the first user;

receive, from the first IDE client, a second request to check in the first component;

determine a first function based on the second request to check in the first component, wherein the first function is defined by a version control system (VCS) application programming interface (API) that allows interaction with multiple third-party VCSs; and invoke the first function, wherein, in response to invoking the first function, a first implementation of the VCS API for a first third-party VCS invokes a second function defined by the first third-party VCS for checking the first component into the first third-party VCS, wherein checking the first component into the first third-party VCS comprises saving the first component into the first third-party VCS, and wherein the repository and the first third-party VCS are distinct.

14. The system of claim 13, wherein the memory further comprises executable instructions to:
- receive, from the IDE client, a third request to access the first component;
- determine a third function based on the third request to access the first component, wherein the third function is defined by the VCS API; and
- invoke the third function,
- wherein, in response to invoking the third function, the first implementation of the VCS API for the first third-party VCS invokes a fourth function defined by the first third-party VCS for checking the first component out of the first third-party VCS.

15. The system of claim 14, wherein the memory further comprises executable instructions to:
- receive, from the IDE client, a fourth request to save a second component developed for the enterprise application;
- determine the first function based on the fourth request to save the second component;
- invoke the first function, wherein, in response to invoking the first function, a second implementation of the VCS API for a second third-party VCS invokes a fifth function defined by the second third-party VCS for checking the second component into the second third-party VCS, wherein checking the second component into the second third-party VCS comprises saving the second component into the second third-party VCS, and wherein the repository and the second third-party VCS are distinct;
- receive, from the IDE client, a fifth request to access the second component;
- determine the third function based on the fifth request to access the second component; and
- invoke the third function, wherein, in response to invoking the third function, the second implementation of the VCS API for the second third-party VCS invokes a sixth function defined by the second third-party VCS for checking the second component out of the second third-party VCS.

16. The system of claim 13, wherein the first component is a definition file.

17. The system of claim 13, wherein the first component is an executable file.

* * * * *